US011958713B2

(12) United States Patent
Gentil et al.

(10) Patent No.: US 11,958,713 B2
(45) Date of Patent: Apr. 16, 2024

(54) SHEET PROCESSING DEVICE

(71) Applicant: BOBST MEX SA, Mex (CH)

(72) Inventors: David Gentil, L'Auberson (CH); Arnaud Jonet, Larringes (FR)

(73) Assignee: BOBST MEX SA, Mex (CH)

( * ) Notice: Subject to any disclaimer, the term of this patent is extended or adjusted under 35 U.S.C. 154(b) by 403 days.

(21) Appl. No.: 17/595,096

(22) PCT Filed: Apr. 29, 2020

(86) PCT No.: PCT/EP2020/061873
§ 371 (c)(1),
(2) Date: Nov. 9, 2021

(87) PCT Pub. No.: WO2020/229179
PCT Pub. Date: Nov. 19, 2020

(65) Prior Publication Data
US 2022/0219925 A1 Jul. 14, 2022

(30) Foreign Application Priority Data
May 15, 2019 (EP) .................................... 19020332

(51) Int. Cl.

| | |
|---|---|
| ***B65H 5/08*** | (2006.01) |
| ***B26D 7/01*** | (2006.01) |
| ***B41F 1/28*** | (2006.01) |
| ***B41F 19/00*** | (2006.01) |

(52) U.S. Cl.
CPC ............. *B65H 5/085* (2013.01); *B26D 7/015* (2013.01); *B41F 1/28* (2013.01); *B41F 19/008* (2013.01); *B65H 2402/60* (2013.01); *B65H 2601/272* (2013.01); *B65H 2801/42* (2013.01)

(58) Field of Classification Search
CPC ....... B65H 5/085; B65H 2402/60; B41F 1/28; B41F 16/00; B41F 19/00; B26D 7/01
See application file for complete search history.

(56) References Cited

U.S. PATENT DOCUMENTS 7,591,223 B2 * 9/2009 Mockli .................. B65H 5/085 101/485
2019/0367305 A1 * 12/2019 Yan ........................ B65H 5/085

FOREIGN PATENT DOCUMENTS

| | | |
|---|---|---|
| CN | 207142372 U | 3/2018 |
| CN | 108203010 A | 6/2018 |
| DE | 10013006 A1 | 9/2001 |

(Continued)

OTHER PUBLICATIONS

International Search Report dated Jun. 5, 2020 in International Application No. PCT/EP2020/061873 (3 pages).

*Primary Examiner* — Patrick Cicchino
(74) *Attorney, Agent, or Firm* — Bookoff McAndrews, PLLC

(57) ABSTRACT

A sheet processing device has a moveable beam (36) that moves in the vertical direction, a gripper bar (30) for gripping a sheet that travels through the sheet processing device (10), and a gripper bar locking device (40) that can lock the gripper bar (30) in a precise position. The gripper bar locking device (40) has a locking lever (68) that is pivoting between a rest position and a locking position. The locking lever (68) is connected to a vertical linear guide coupled with the moveable beam (36) resulting in a precise, compact and simple system to lock the gripper bar.

11 Claims, 13 Drawing Sheets

(56) References Cited

FOREIGN PATENT DOCUMENTS

Figure 1:
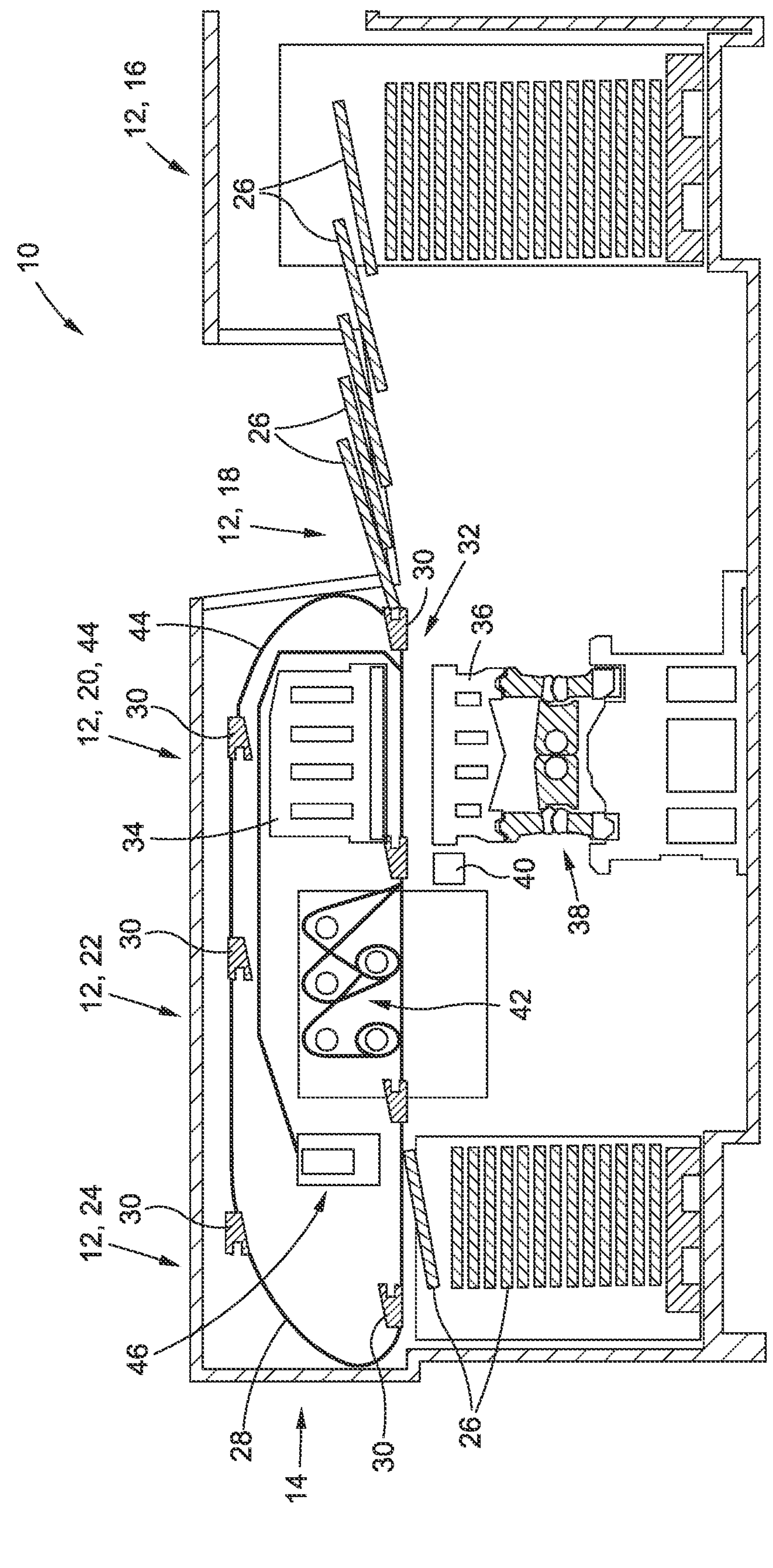

| | | | | |
|---|---|---|---|---|
| DE | 102010001806 | A1 | 8/2011 | |
| DE | 202005021993 | U1 | 2/2012 | |
| WO | 2018006810 | A1 | 1/2018 | |
| WO | WO-2018006810 | A1 * | 1/2018 | ............ B41F 19/008 |
| WO | 2018116157 | A1 | 6/2018 | |

* cited by examiner

SHEET PROCESSING DEVICE

CROSS-REFERENCE TO RELATED APPLICATION(S)

This application is a National Stage under 35 U.S.C. § 371 of International Application No. PCT/EP2020/061873, filed Apr. 29, 2020, which claims priority to European Patent Application No. 19020332.3, filed May 15, 2019, the contents of all of which are incorporated by reference in their entirety.

The invention relates to a sheet processing device such as a die-cutting machine or a foil stamping machine.

It is known practice to move sheets within a sheet processing device from one processing station to another. For this purpose, gripper bars are commonly used which grip a sheet at a first processing station and transport it to another station at which letters and/or patterns are transferred onto the sheet or parts of the sheet are cut out.

The quality of the printing and/or cutting process is directly linked to the precision in positioning of the gripper bars at the processing station.

Even small offsets of the sheet form the target position can have a huge impact on the production. An offset in the positioning of the gripper bar can lead, for example, to an offset of the printing area on the sheet or to the cutting of processed parts of the sheet.

It is therefore essential that the gripper bars are in a precisely defined position when they grip a sheet to be moved through the machine and the processing stations. To this end, the gripper bars are usually locked in a precise position by means of a gripper bar locking device. There are however some constraints regarding the position of and space for such locking device.

WO 2018/116157 and WO 2018/006810 disclose gripper bar locking system that use a rotating cam to position a locking lever from a locking position to a rest position and vice-versa. The rotation of the cam is synchronized with the platen press motion. In WO 2018/116157 the locking device is used at the input of the platen, whereas in WO 2018/006810 it is used at the output of the platen.

Therefore, it is the objective of the invention to provide a sheet processing device has a gripper bar locking device which can be mounted within a restricted space and allows locking the grippe bar in a precisely defined position.

In order to solve this object, the invention provides a sheet processing device comprising a moveable beam being moveable in the vertical direction, a gripper bar for gripping a sheet to be transferred through the sheet processing device, and a gripper bar locking device for locking the gripper bar in a precise position, wherein the gripper bar locking device has a locking lever being pivotable about a pivot axis between a rest position and a locking position. The locking lever may be pivotally mounted to a carriage which is mounted on a linear guide; said carriage is coupled to the moveable beam, in particular in the vertical direction. The linear guide provides for a precise position of the locking lever even if the moveable beam undergoes some unexpected motion, in particular along a non-vertical direction. The carriage allows to add the locking device to existing machines without requiring substantial changes to the moveable beam.

The invention provides a gripper bar locking device that translates the vertical movement of the moveable beam into a movement of a locking lever for locking the gripper bar in a precise position.

Please note that there is no rotating cam mechanism between the moveable beam and the locking lever. Further, the locking lever does not require much space so that it can be fitted to machines which do not offer much space.

Advantageously, the locking lever is connected to the moveable beam such that a vertical movement of the moveable beam is converted into a stroke of a locking end of the locking lever which is larger than the vertical stroke of the moveable beam. This allows the gripper bar locking device to be used even with moveable beams that have only a small vertical stroke.

In order to ensure that small horizontal movements of the moveable beam do not affect the position of the locking lever, a sliding guide may be provided for transferring the vertical movement of the moveable beam to the carriage, the sliding guide allowing a movement of the moveable beam with respect to the carriage in a direction which is perpendicular to the vertical direction.

In one embodiment of the invention, the carriage has a stop for defining the locking position of the locking lever. Thereby, a very precise position is provided for the gripper bar.

Advantageously, the locking lever is a two-armed lever, with the end of the lever which is opposite the locking end being connected to a pull rod. The pull rod serves a (substantially) stationary support for the locking lever so that it is automatically pivoted into the locking position when the carriage is displaced via the moveable beam.

In order to ensure that the locking lever reaches the locking position in any case, the arrangement of the pull rod is such that the locking lever is pivoted into the locking position before the carriage reaches to fully displaced position. For allowing the remaining over-stroke of the carriage, a spring is provided within the pull rod.

A stop may be provided at the pull rod limiting the movement of the locking lever in one direction. Thereby, the rest position of the locking lever is defined.

In one embodiment of the invention, the locking lever is provided with a roller at its locking end. This allows a vertical movement between the gripper bar and the locking lever without significant friction.

The gripper bar may comprise an anvil for cooperating with the roller such that the longitudinal position of the gripper bar remains unaffected when there is a vertical movement of the gripper bar with respect to the locking lever. The longitudinal position being the position along the sheet feeding direction. This can be advantageously implemented by having an anvil with a vertical surface portion. Thus, when the roller of the locking lever travels vertically, it rolls over said surface portion and does not affect the position of the gripper bar along the sheet feeding direction.

The moveable beam may be a lower part of a platen press. This allows for a simple and direct transfer of the movement of the platen press into a movement of the locking lever. In a platen press, the motion of the movable beam compresses the sheet toward the tools (e.g. knives or stamps) attached to an upper fixed beam.

In one embodiment of the invention, the sheet processing device comprises a hot foil stamping press and/or a die-cutting machine. Thus, the sheet can be processed according to requirements.

Figure 2:
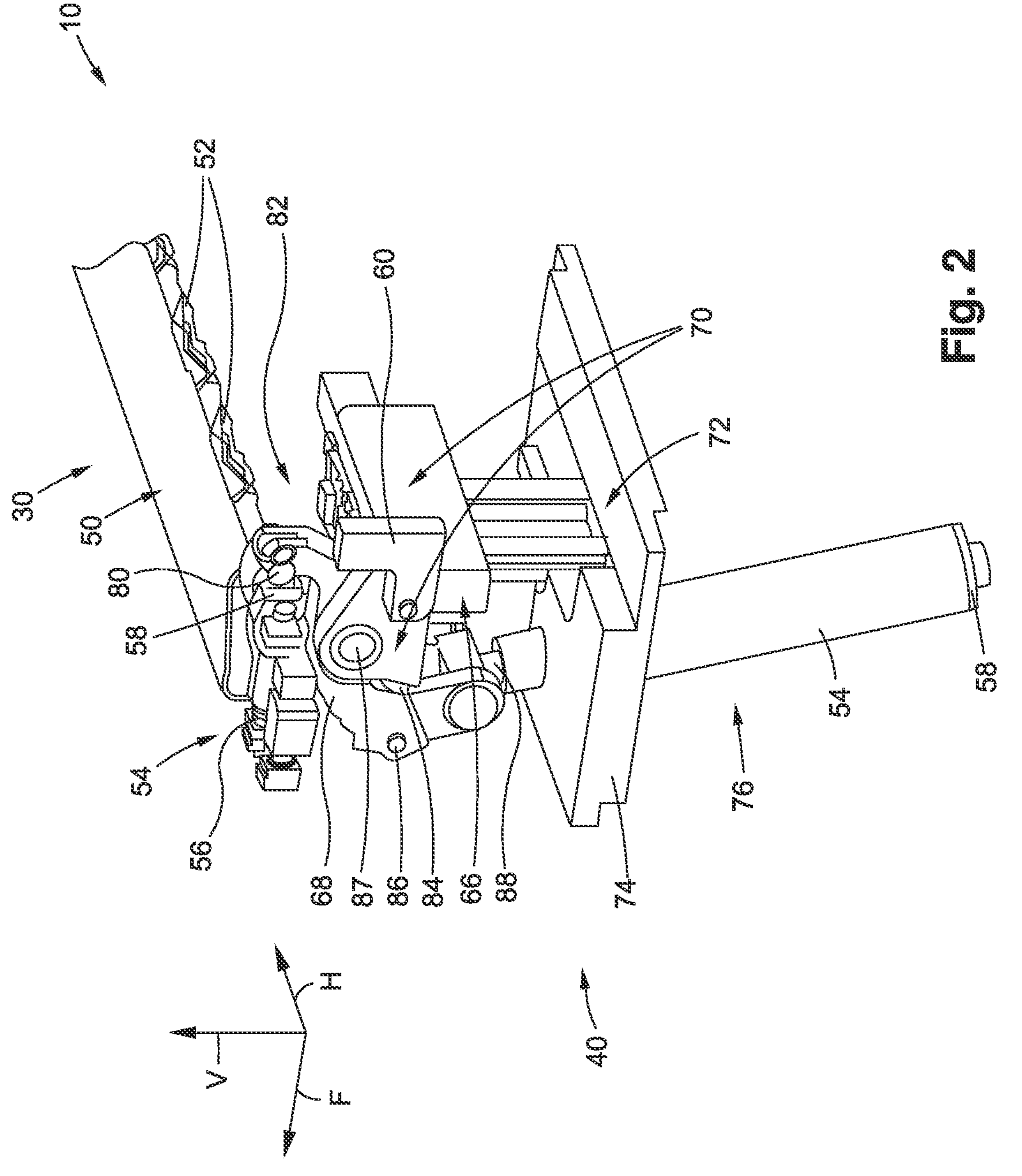
Figure 3:
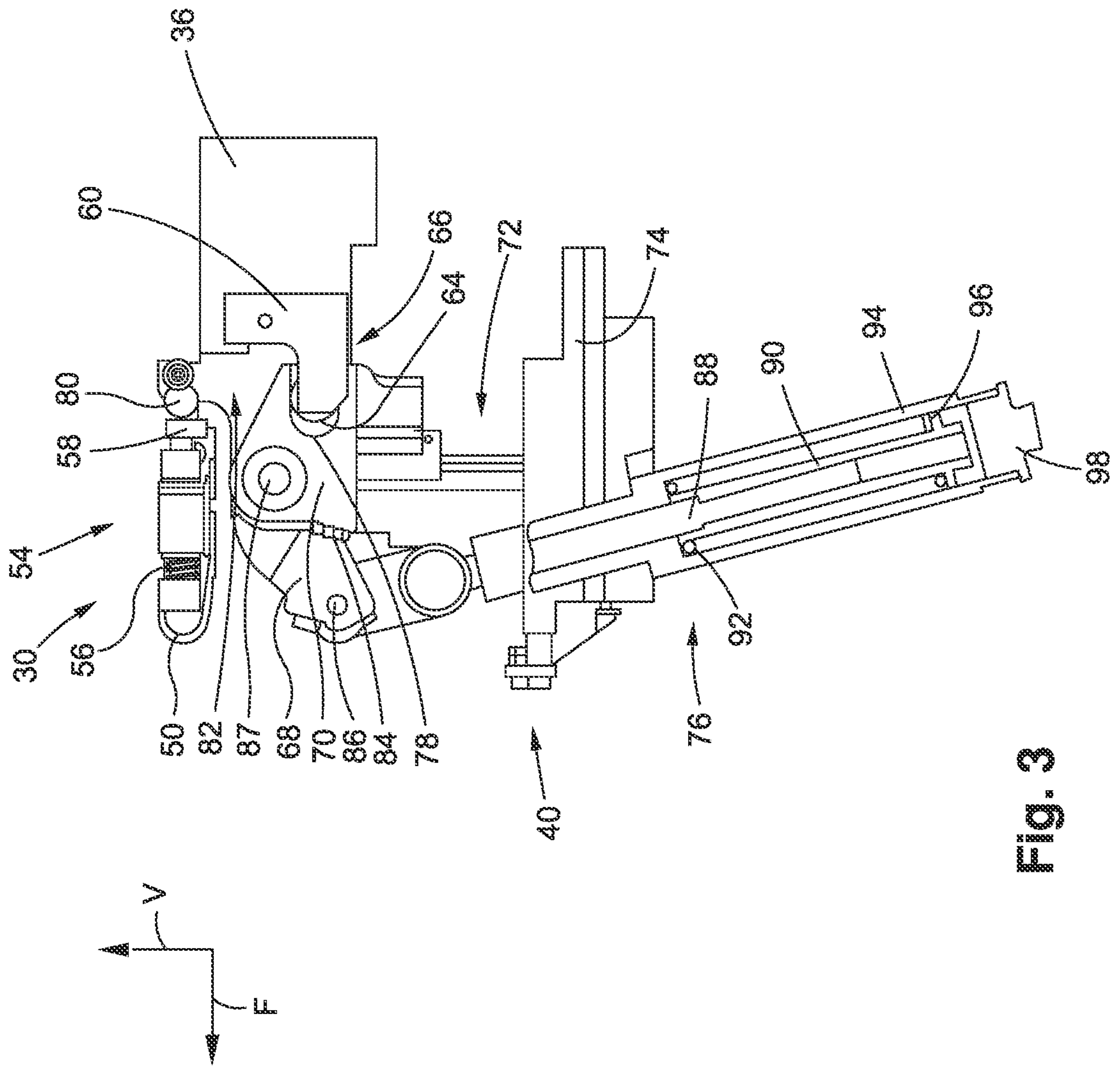
Figure 9:
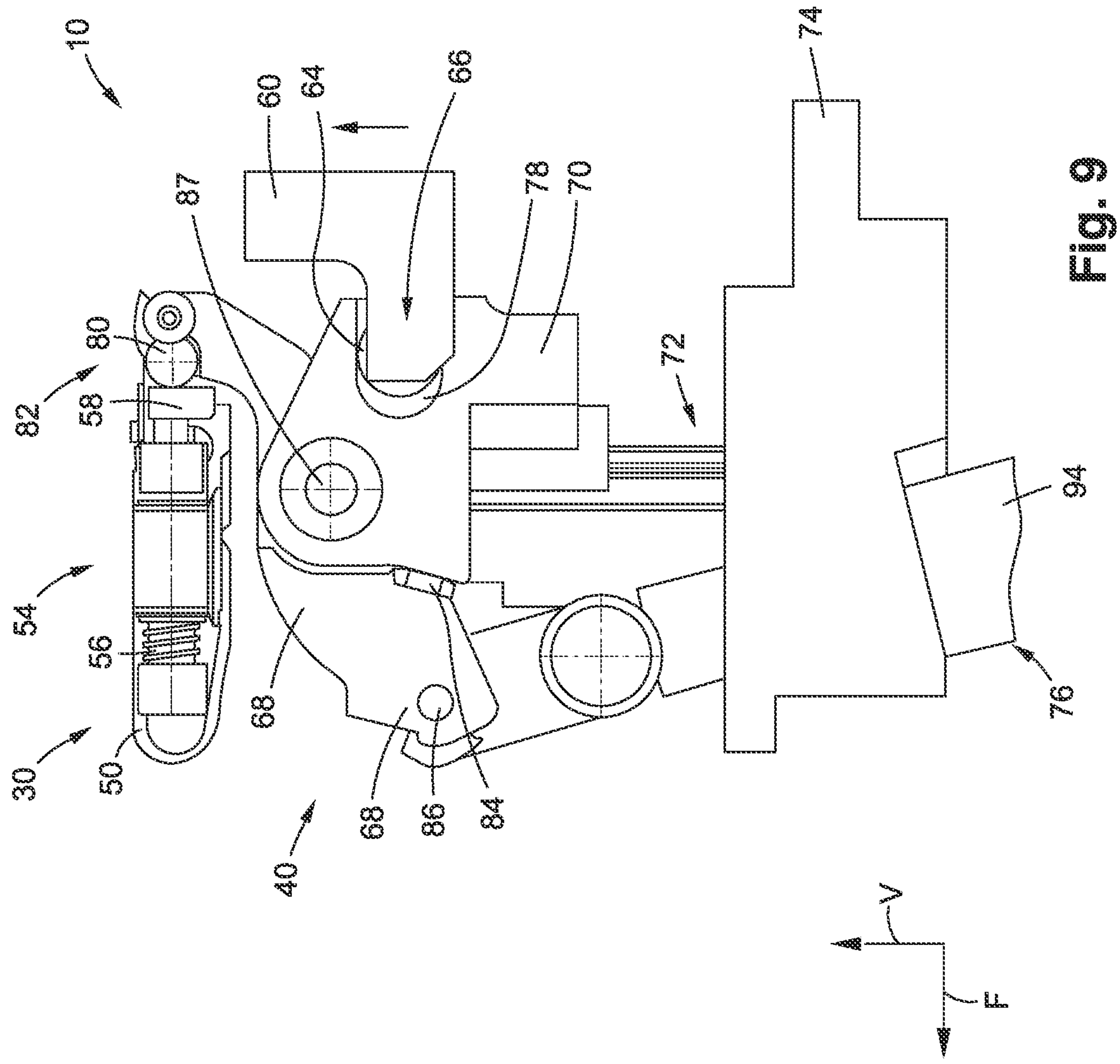
Figure 10:
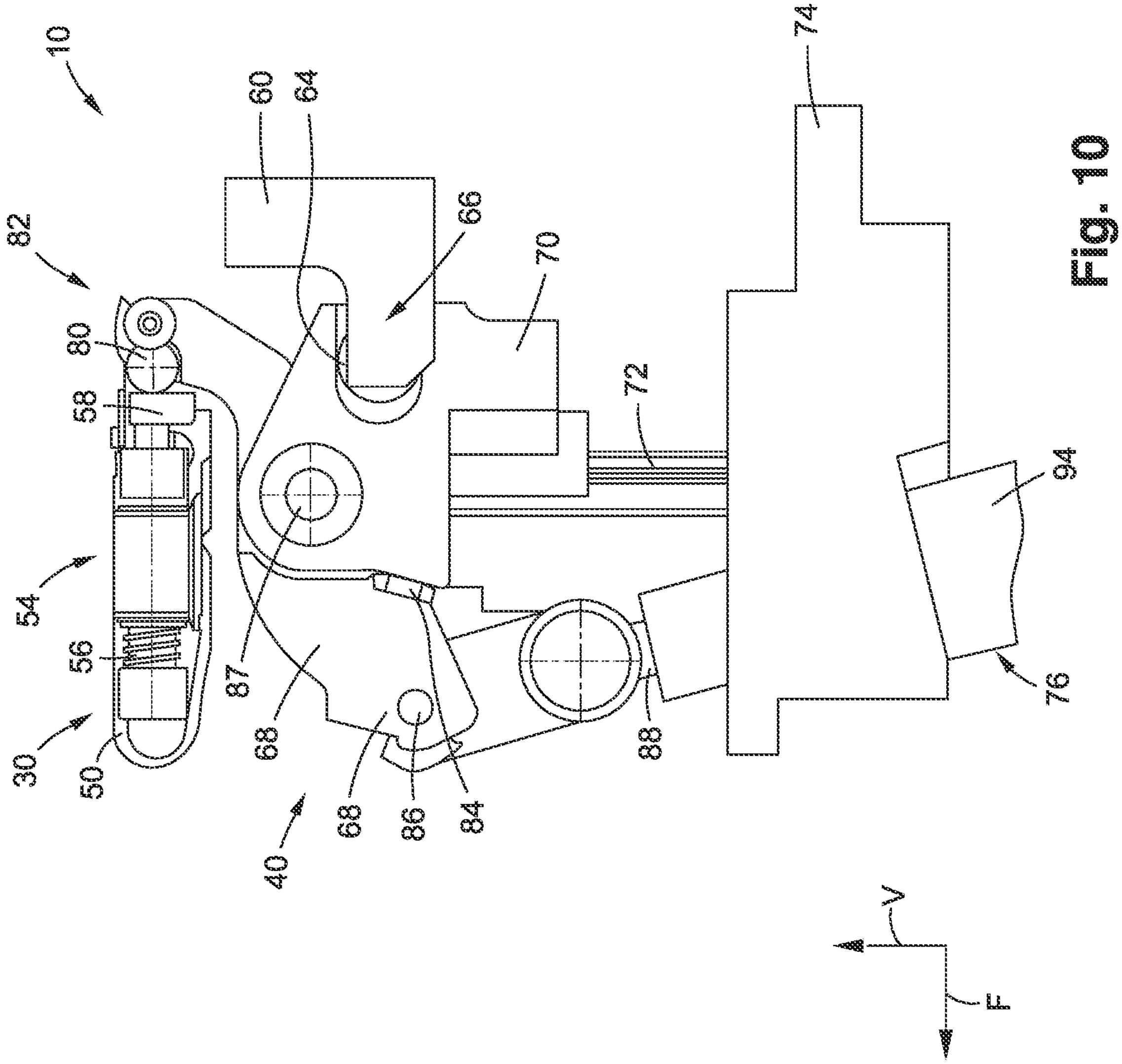
Figure 11:
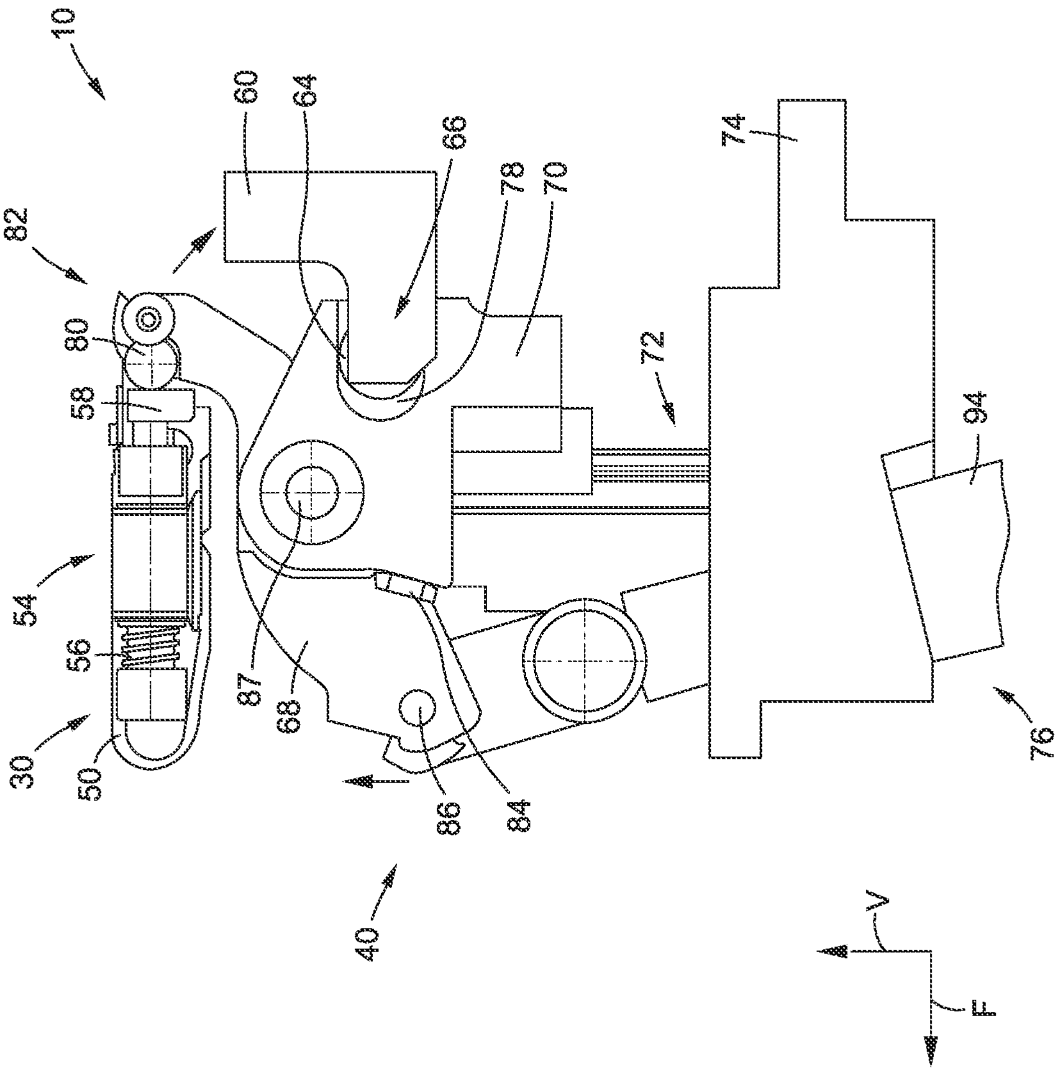
Figure 12:
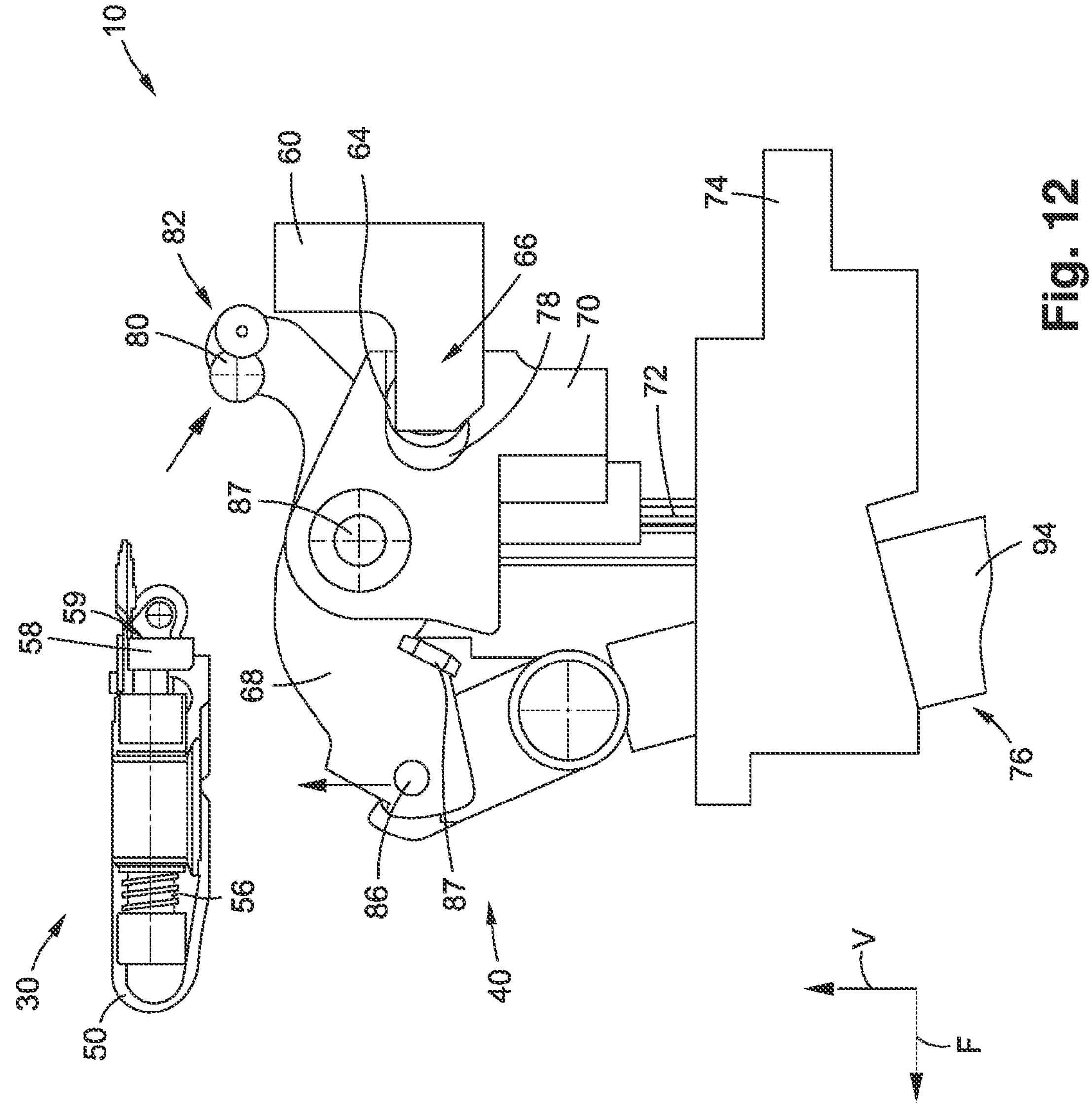
Figure 13:
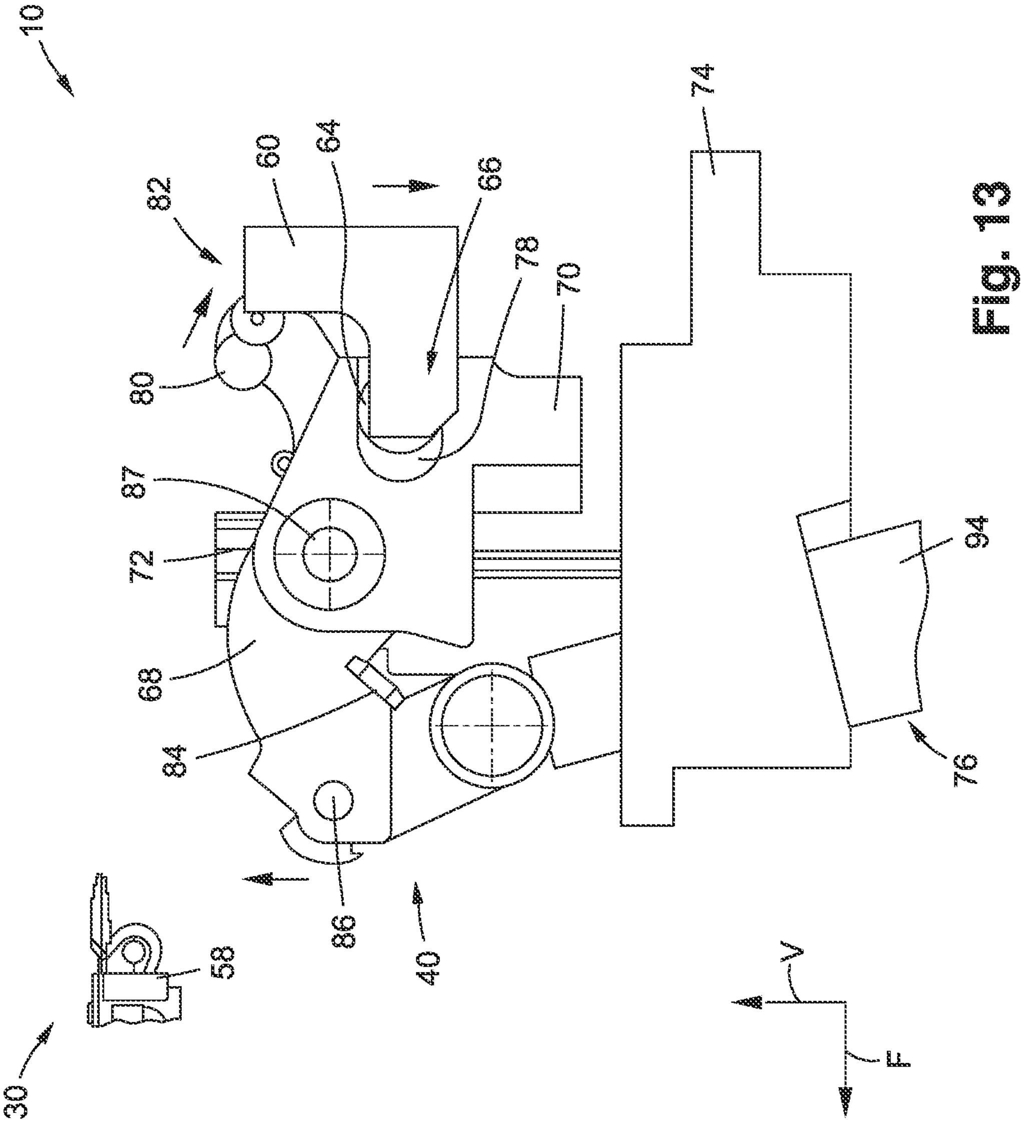

Further features and advantages of the invention will be apparent from the following description of one embodiment of the present invention with the aid of the enclosed drawings, in which:

FIG. 1 is a schematic side view of a sheet processing device,

FIG. 2 is a detailed perspective view of the sheet processing device of FIG. 1 showing a gripper bar locking device and a gripper bar, FIG. 3 is a detailed side view with a partial section view of the sheet processing device of FIG. 2, FIGS. 4 to 10 are side views of the processing device of FIG. 3 showing the movement of the gripper bar locking device from the rest position into the locking position, and FIGS. 11 to 13 are side views of the processing device of FIG. 3 showing the movement of the gripper bar locking device from the locking position into the rest position.

In FIG. 1, the essential parts of a sheet processing device 10 are shown. Sheet processing device 10 comprises a number of processing stations 12 and a conveyor device 14.

In FIG. 1, processing stations 12 are in particular a feeder 16, a feed board 18, a stamping station 20, a foil feed and recovery station 22, and a receiving station 24.

Feeder 16 provides sheets 26 to subsequent processing stations 12. For this purpose, sheets 26 are stacked and successively taken off the top of the stack by a transporting member which transports them as far as the directly adjacent feed board 18.

For the sake of clarity, only some sheets 26 are labeled with reference numbers in FIG. 1 and not all of them. Sheets 26 can be cardboard or paper.

At feed board 18, sheets 26 are laid out by the transporting member, which means that they are laid one after the other with partial overlap. The whole of the layer is then driven along a platform towards stamping station 20, by means of a belt-type conveyor mechanism.

To transport sheets 26 to subsequent processing stations 12, conveyor device 14 has a conveyor belt 28 and a number of gripper bars 30 attached to conveyor belt 28. Conveyor belt 28 is arranged in a loop which allows gripper bars 30 to follow a trajectory that passes in succession through stamping station 20, feed and recovery station 22 and receiving station 24.

Conveyor belt 28 may for example comprise two sets of chains arranged laterally along each side of stamping station 20. The gripper bars 30 are fixed on the sets of chains with a regular space.

Thus gripper bar 30 grips a sheet 26 at the end of feed board 18 and transports it to stamping station 20.

Stamping station 20 comprises a platen press 32 with a top platen 34, a moveable beam 36, and a movement mechanism 38, and a gripper bar locking device 40.

Top platen 34 is fixed in its position and serves as counterpart to moveable beam 36. Moveable beam 36 is moved by movement mechanism 38 in the vertical direction, i.e. towards top platen 34.

Gripper bar locking device 40 is adapted to lock gripper bar 30 in a precise position such that sheet 26 can be processed precisely by a processing station 12. Gripper bar locking device 40 will be described with exact details below in the description of FIGS. 2 and 3.

Foil feed and recovery station 22 comprises a feed reel 42 for providing a foil 44 and a take-up device 46 for removing used foil 44.

Foil 44 is either a metallized plastic foil or a thin metal foil.

In the embodiment shown in FIG. 1, foil 44 is fed such that it passes through stamping station 20 on its way from feed reel 42 to take up device 46.

At stamping station 20, sheet 26 is pressed by moveable beam 36 against top platen 34 and foil 44 is arranged between sheet 26 and top platen 34. Thereby text and/or patterns are transferred from foil 44 onto sheet 26. Thus stamping station 20 is a hot foil stamping press 48.

After stamping station 20, sheet 26 is fed to receiving station 24 which collects processed sheet 26. In particular, receiving station 24 arranges processed sheets 26 back into a stack. To do that, conveyor device 14 is arranged to release each sheet 26 automatically when sheet 26 comes back into line with this new stack.

In general, sheet processing device 10 can also comprise a die-cutting machine.

Referring to FIGS. 2 and 3, the gripper bar locking device 40 is described in detail in the following. FIG. 2 shows a perspective view of sheet processing device 10 at the outlet of stamping station 20 and FIG. 3 a side view of sheet processing device 10 at the same outlet.

The coordinate system referred to below is shown in FIGS. 2 and 3 by arrows. The coordinate system is aligned in three dimensions with vertical direction V, sheet feeding direction F, and horizontal direction H. Vertical direction V is aligned with the movement direction of moveable beam 36 and sheet feeding direction F is aligned with the direction in which sheets 26 are moved. Horizontal direction H is aligned perpendicular to vertical direction V and sheet feeding direction F.

As can be seen in FIG. 2, gripper bar 30 has a body 50, several gripper arms 52 for gripping sheet 26, and a fastening system 54 with which gripper bar 30 is attached to conveyor belt 28.

Gripper arms 52 extend away from body 50 in the opposite direction to sheet feeding direction F and are arranged at regular intervals along horizontal direction H.

Fastening system 54 has a fastening spring 56 and a fastening anvil 58, fastening anvil 58 being connected firmly to body 50 of gripper bar 30 and coupled to one end of spring 56.

Hence, gripper bar 30 can be moved in sheet feeding direction F by tensioning spring 56.

As it can be seen in FIG. 3, a coupling component 60 is attached to moveable beam 36 by means of bolts, coupling component 60 being essentially L-shaped. A roller 64 is rotatably attached to one end of coupling component 60.

More precisely, roller 64 is attached to an end of coupling component 60 that projects in sheet feeding direction F away from moveable beam 36.

Coupling component 60 is coupled to the movement of moveable beam 36.

Coming back to FIG. 2, gripper bar locking device 40 comprises a locking lever 68, a carriage 70, a linear guide 72, a support structure 74, and a pull rod 76.

Support structure 74 provides the structure for gripper bar locking device 40 through which gripper bar locking device 40 can be positioned within sheet processing device 10.

Linear guide 72 is fixed to support structure 74 and oriented in the vertical direction V.

More precisely, linear guide 72 is arranged parallel to the movement direction of moveable beam 36.

Carriage 70 has an U-shaped recess 78, recess 78 being arranged essentially in sheet feeding direction F which is perpendicular to the movement direction of moveable beam 36.

Carriage 70 is mounted in linear guide 72 via a slide bearing such that carriage 70 can move within linear guide 72 in and opposite to vertical direction V.

Carriage 70 is coupled to the vertical movement of moveable beam 36 by a sliding guide 66 formed by recess 78 of carriage 70 and roller 64 of coupling component 60, roller 64 being adapted to glide inside recess 78 in and opposite to sheet feeding direction F.

More precisely, a movement in vertical direction V leads to roller 64 engaging at upper end (in vertical direction V) of recess 78 such that carriage 70 moves as well in vertical direction V. If moveable beam 36 moves downwards in vertical direction V, roller will engage at the lower end of recess 78 pushing carriage 70 downwards as well.

Additionally, a small movement of moveable beam 36 in sheet feeding direction F will lead to roller 64 moving further inwards in recess 78 such that moveable beam 36 can move relative to carriage 70 in a direction transverse to vertical direction V.

Hence, the movement of moveable beam 36 leads to a vertical movement only of carriage 70 and not to a movement in sheet feeding direction F, which could lead to a displacement of carriage 70 and, hence, of gripper bar locking device 40.

As shown in FIG. 2, locking lever 68 is a two-armed lever mounted at carriage 70 with a roller 80 on locking end 82 of lever 68, and an anvil 84 and a connecting axis 86 on the side of lever 68 opposite to locking end 82.

Locking lever 68 is pivotable about a pivot axis 87 arranged at carriage 70. More precisely, locking lever 68 is pivotable between a rest position (shown in FIG. 4) and a locking position (shown in FIGS. 2 and 3).

Anvil 84 is arranged at a side surface of locking lever 68 facing carriage 70 and defines one stop of the locking lever 68.

In particular, anvil 84 determines the locking position of locking lever 68 by engaging at carriage 70. This will be explained further with reference to FIGS. 4 to 10.

Connecting axis 86 forms the connection between locking lever 68 and pull rod 76.

As shown in the partial section view of FIG. 3, pull rod 76 has an inner pull rod 88, an outer pull rod 90, a spring 92, and a casing 94.

Outer pull rod 90 is tubular in shape and has a ring-shaped shoulder 96 arranged at the outside of outer pull rod 90.

The inner pull rod 88 has a tapered end which is arranged inside outer pull rod 88.

Outer pull rod 90 and inner pull rod 88 are detachably fixed with each other. A screw connection can be used here.

Spring 92 is arranged starting from shoulder 96 in the direction of locking lever 68 and enclosed by casing 94. Therefore, casing 94 is coupled to the other side of spring 92 and spring 92 is tensioned through a movement of outer pull rod 90 in the direction of locking lever 68.

Casing 94 is tubular in shape and encloses inner pull rod 88, outer pull rod 90, and spring 92.

At the end of casing 94 facing locking lever 68 an opening is provided through which inner pull rod 88 can protrude from casing 94. At the other end of casing 94, a stop 98 is provided for the outer pull rod 90.

In the following, the movement of the gripper bar locking device 40 from its rest position to the locking position and vice versa is described with reference to FIGS. 4 to 13.

First, the result of the upward movement of moveable beam 36 on the locking lever is described with reference to FIGS. 4 to 10.

Figure 4:
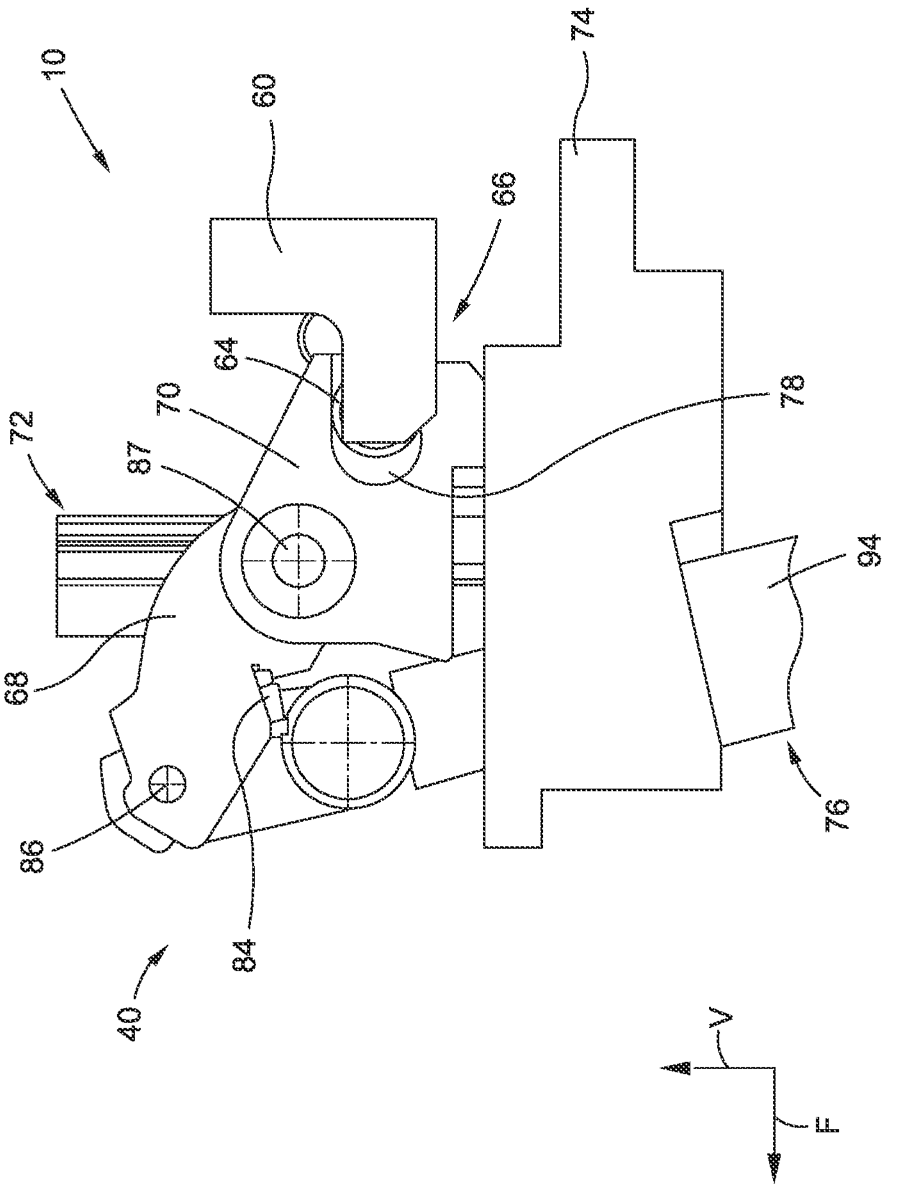

In FIG. 4, gripper bar locking device 40 is in its rest position. More precisely, locking lever 68 is in its rest position and carriage 70 is in terms of its movement in linear guide 72 at the lower stop.

Additionally, the side of locking lever 68 opposite to the locking end 82 is at its highest position in vertical direction V and locking end 82 at its lowest. In FIG. 4, locking end 82 is covered by sliding guide 66.

Figure 5:
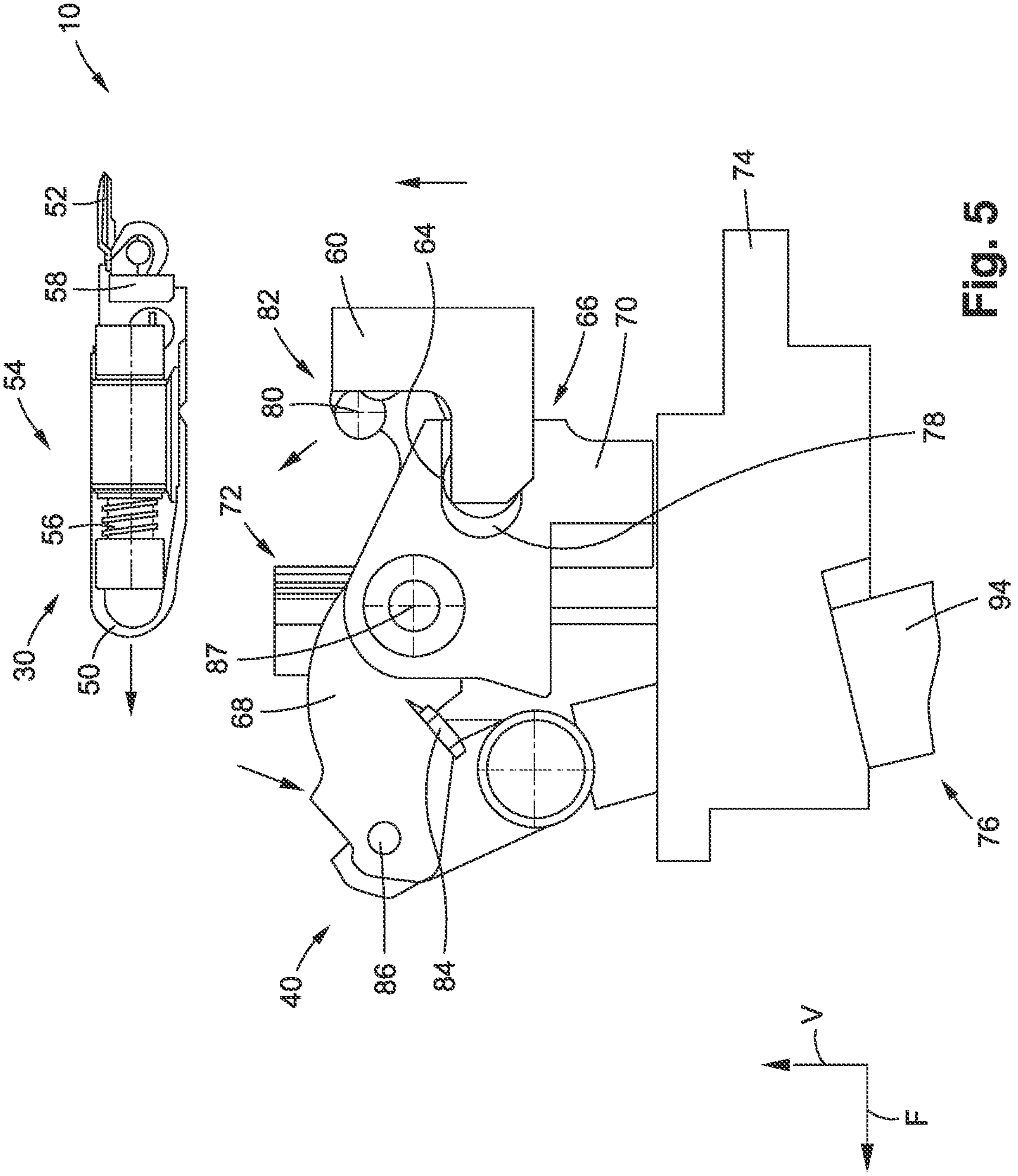

From FIGS. 4 to 5, moveable beam 36 is starting to move in vertical direction V This is shown by an arrow next to coupling element 60 pointing in vertical direction V. Additionally, gripper bar 30 is advancing in sheet feeding direction F.

The movement of moveable beam 36 in vertical direction V leads to a force of roller 64 in recess 78 in vertical direction V. Therefore, carriage 70 is moving as well in vertical direction V.

Due to the upward movement of carriage 70, lever 68 also moves in vertical direction V. Thus inner pull rod 88 and outer pull rod 90 are pulled essentially in vertical direction V by which spring 92 is tensioned.

Therefore, spring 92 is inducing a force on locking lever 68 in the counterclockwise direction and locking lever 68 starts to pivot about pivot axis 87 in the counterclockwise direction.

Figure 6:
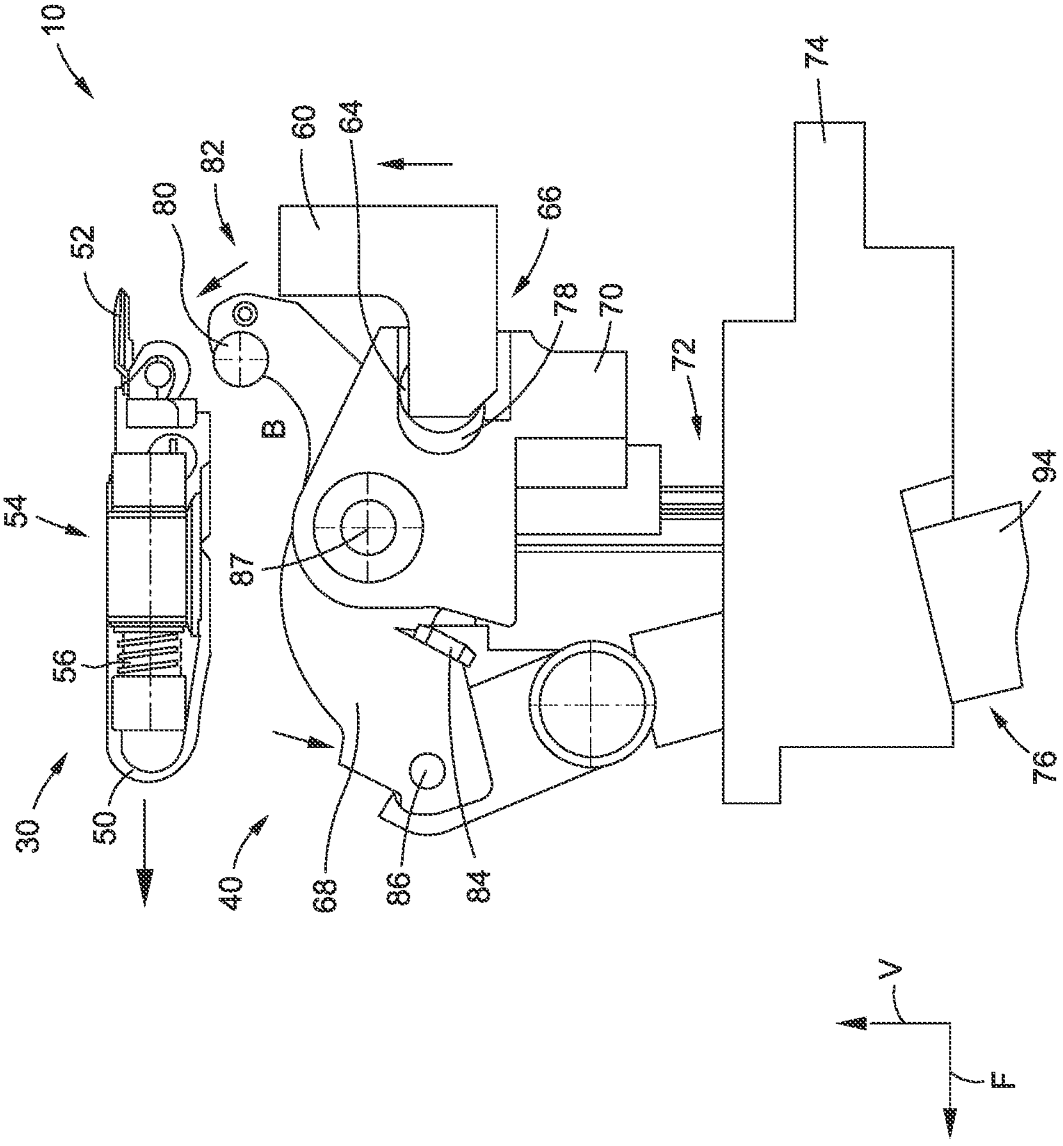

Coming now to FIG. 6, gripper bar 30 is advancing further in sheet feeding direction F and moveable beam 36 is moving further in vertical direction V. Thus, locking lever 68 is continuing to pivot about pivot axis 87 in the counterclockwise direction. These movements are illustrated in FIG. 6 by arrows.

Figure 7:
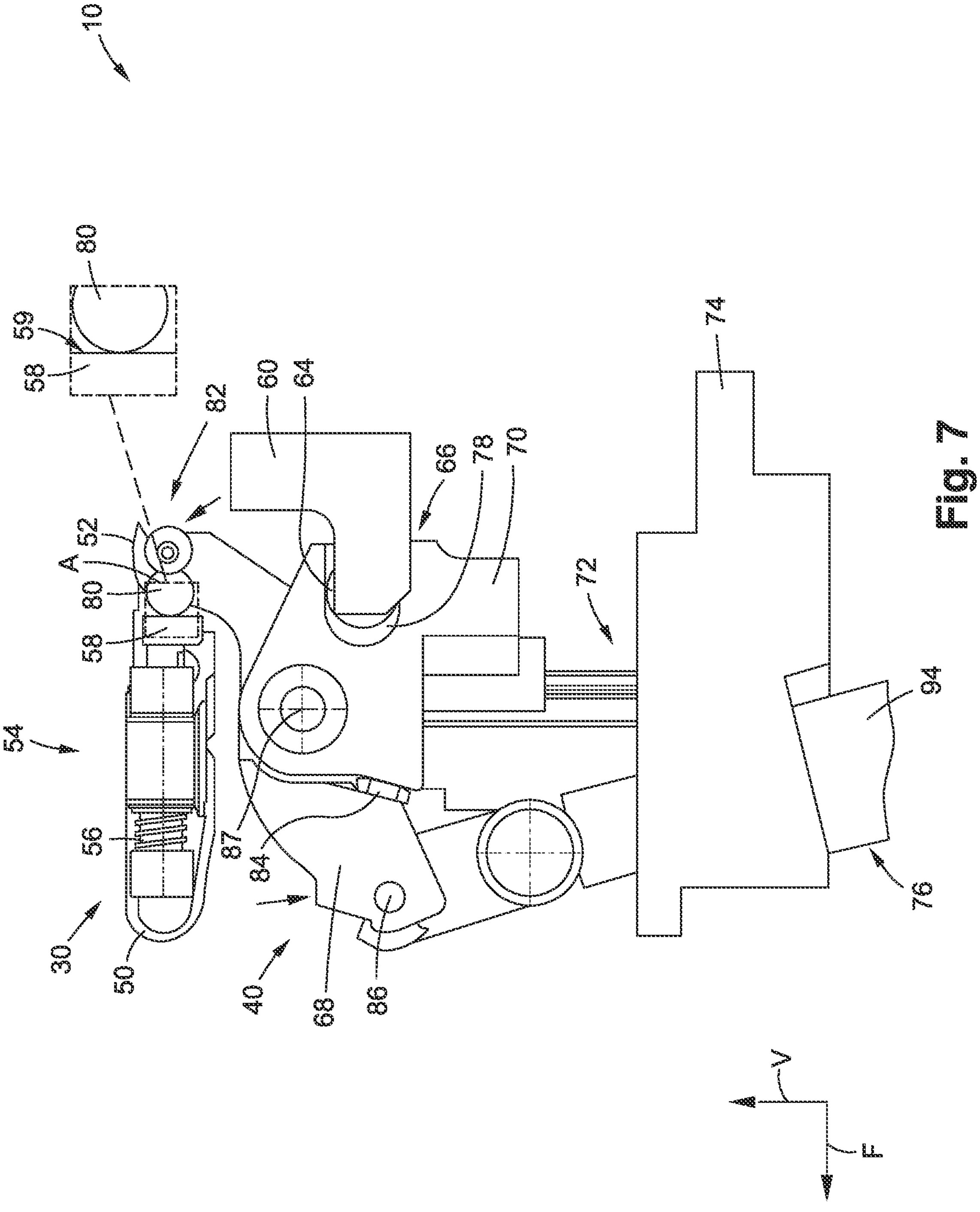

In FIG. 7, gripper bar 30 is not advancing further in sheet feeding direction F due to a stop of conveyor belt 28. Moveable beam 36 is continuing, however, to move in vertical direction V such that gripper bar locking device 40 is engaging at gripper bar 30.

More precisely, roller 80 of locking lever 68 is engaging at anvil 58. This is shown in enlarged detail A of FIG. 7.

Figure 8:
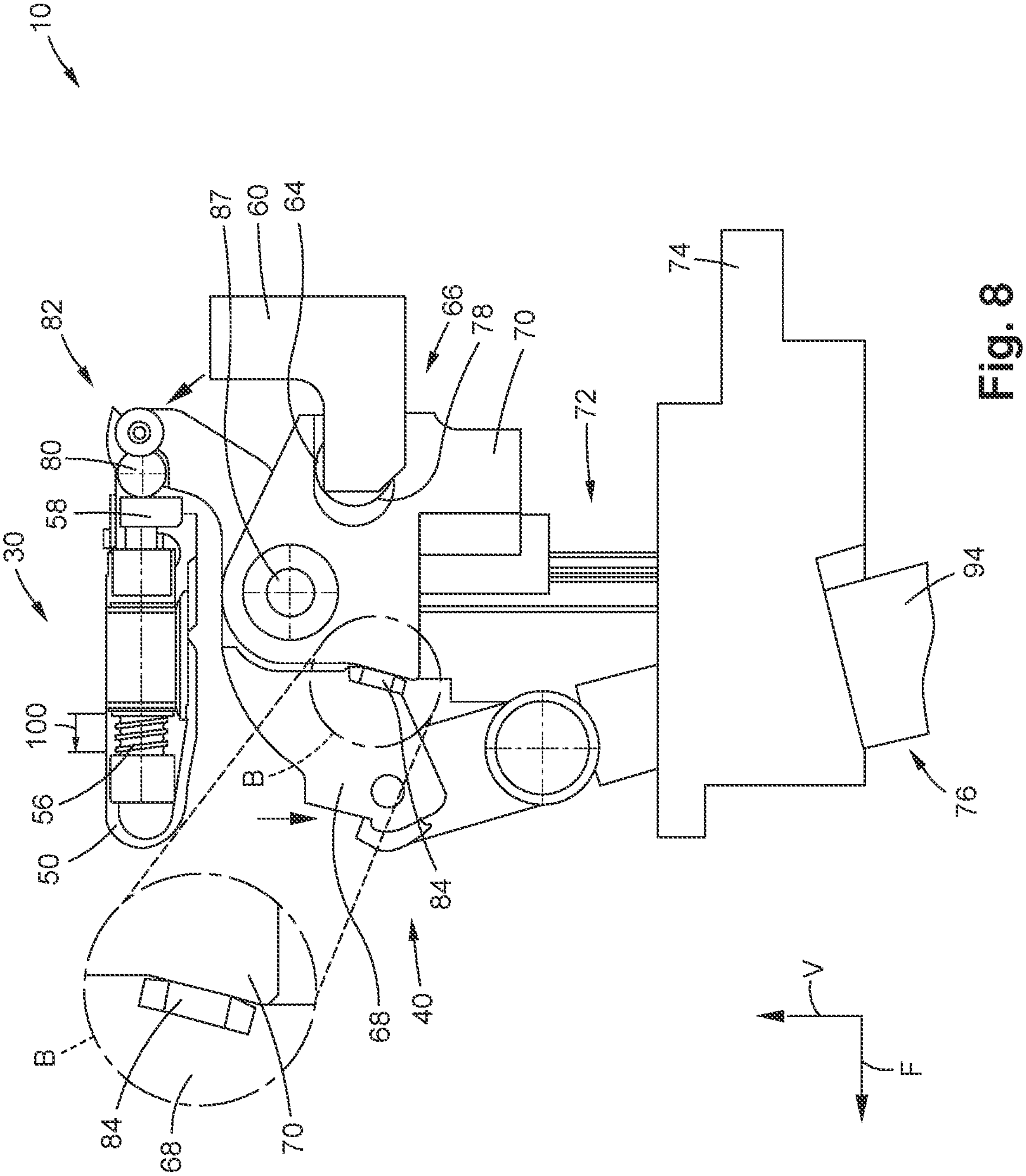

Referring now to FIG. 8, moveable beam 36 is still moving in vertical direction V and thus carriage 70 as well. Thus, lever 68 pivots further in the counterclockwise direction.

Since lever 68 is still pivoting in the counterclockwise direction, roller 80 pushes anvil 58 and, hence, gripper bar 30 is pushed in the sheet feeding direction F resulting in a tensioning of spring 56. This is illustrated by arrow 100.

The pivoting movement of lever 68 is stopped by anvil 84 engaging at carriage 70 as shown in the enlarged detail B of FIG. 8. Hence, locking lever 68 is in its locking position and gripper bar 30 is locked by roller 80 pushing anvil 58 in sheet feeding direction F.

Therefore, gripper bar 30 is in a precise position.

Comparing FIG. 8 with FIG. 4, it can be seen that the vertical stroke of locking end 82 is larger than the vertical stroke of coupling component 60 and thus larger as the vertical stroke of moveable beam 36.

Hence gripper bar locking device 40 translates the vertical stroke of moveable beam 36 into an even larger vertical stroke of locking end 82 of locking lever 68. This enables a precise positioning of gripper bar 30 in sheet processing devices 10 and at the same time let the gripper bars 30 travel from one processing station 12 to another.

In FIG. 9, moveable beam 36 is continuing to move in vertical direction V. As locking lever 68 cannot pivot any further in the counterclockwise direction, spring 92 of pull rod is tensioned leading to an over stroke of pull rod 76, i.e. outer pull rod 90 is not coupled any more to stop 98 (see FIG. 3).

This is illustrated in FIG. 10 by inner pull rod 88 extending outwards of casing 94.

The over stroke of pull rod 76 leads to a movement of carriage 70 further in vertical direction V such that roller 80 is engaging at a position more upwards at anvil 58.

This means that gripper bar 30 is already fixed in its position before moveable beam 36 reaches its highest point.

Referring now to FIGS. 11 to 13, the result of the downward movement of moveable beam 36 will be explained.

As moveable beam 36 moves downwards, illustrated by an arrow, outer pull rod 90 engages again at stop 98 leading to a movement of locking lever 68 in the clockwise direction. Hence, spring 56 is released again and gripper bar 30 moves slightly in the direction opposite to sheet feeding direction F.

In FIG. 12, gripper bar 30 continues to advance in sheet feeding direction F and locking lever 68 continues to pivot further in the clockwise direction due to the movement of moveable beam 36 in the direction opposite to vertical direction V.

FIG. 13 shows the situation shortly before FIG. 4, in which gripper bar 30 has moved a sheet (now shown) away from processing station 12 at which gripper bar locking device 40 is positioned. Locking lever 68 has almost arrived back at its rest position.

The embodiment of FIGS. 1 to 13 show only an example for a usage of gripper bar locking device 40.

In principle, it is conceivable to position gripper bar locking devices 40 at multiple processing stations 12 of sheet processing device 10 and or to position more than one gripper bar locking devices 40 at a processing station 12.

The invention claimed is:

1. A sheet processing device comprising:
- a moveable beam being moveable in a vertical direction;
- a gripper bar 0 for gripping a sheet to be transferred through the sheet processing device along a sheet feed direction which is perpendicular to the vertical direction; and
- a gripper bar locking device for locking the gripper bar in a precise position along the sheet feed direction,
- wherein the gripper bar locking device has a locking lever being pivotable about a pivot axis between a rest position and a locking position, and
- wherein the locking lever is pivotally mounted to a carriage, which is mounted on a linear guide and is coupled vertically to the moveable beam.

2. The sheet processing device of claim 1, further comprising:
- a sliding guide for transferring a movement of the moveable beam in the vertical direction to the carriage, the sliding guide allowing a movement of the moveable beam with respect to the carriage in a direction which is perpendicular to the vertical direction.

3. The sheet processing device of claim 1,
- wherein the carriage includes a stop for defining the locking position of the locking lever.

4. The sheet processing device of claim 1, wherein the locking lever is a two-armed lever, with an end of the locking lever which is opposite a locking end being connected to a pull rod.

5. The sheet processing device of claim 4, further comprising:
- a spring provided within the pull rod.

6. The sheet processing device of claim 4, further comprising:
- a stop is provided at the pull rod to limit a movement of the locking lever in one direction.

7. The sheet processing device of claim 1, wherein the locking lever is provided with a roller at a locking end.

8. The sheet processing device of claim 7, wherein the gripper bar comprises an anvil for cooperating with the roller.

9. The sheet processing device of claim 8, wherein a surface of the anvil comprises a vertical section, and the surface of the anvil is in contact with the roller when the anvil and the roller cooperate.

10. The sheet processing device of claim 1, wherein the moveable beam is a lower part of a platen press.

11. The sheet processing device of claim 1, wherein the sheet processing device comprises a hot foil stamping press and/or a die-cutting machine.

* * * * *